United States Patent [19]

Kuhnle et al.

[11] 4,297,875

[45] Nov. 3, 1981

[54] APPARATUS FOR INTRODUCING A FORCE TO BE MEASURED INTO A BENDING ROD

[75] Inventors: Ernst Kuhnle; Josef Schwarz, both of Balingen, Fed. Rep. of Germany

[73] Assignee: Bizerba-Werke Wilhelm Kraut KG, Fed. Rep. of Germany

[21] Appl. No.: 140,605

[22] Filed: Apr. 15, 1980

[30] Foreign Application Priority Data

Apr. 18, 1979 [DE] Fed. Rep. of Germany ....... 2915553

[51] Int. Cl.³ .............................................. G01L 1/22
[52] U.S. Cl. ................................ 73/862.62; 177/211; 177/DIG. 9; 73/862.65
[58] Field of Search ............ 73/141 A, 432 A, 862.62, 73/862.65; 177/DIG. 9, 211

[56] References Cited

U.S. PATENT DOCUMENTS 4,037,675 7/1977 Storace et al. ............... 177/DIG. 9

FOREIGN PATENT DOCUMENTS 2531746 9/1976 Fed. Rep. of Germany .

975170 11/1964 United Kingdom .

OTHER PUBLICATIONS

German Report "VOI-Ber. Nr. 202, 1973".

Primary Examiner—Anthony V. Ciarlante
Attorney, Agent, or Firm—Kenway & Jenney

[57] ABSTRACT

Apparatus is provided for introducing a force to be measured from a force transfer element into the free end of a bending rod held rigidly at one end. The apparatus comprises means, e.g. two knife-edges for guiding the force transfer element in the direction of the bending rod, a first rounded contact surface on the force transfer element, a second rounded contact surface on the bending rod, a coupling element having first and second flat parallel spaced substantially horizontal surfaces and interposed between the first and second contact points with its first surface bearing against the first contact surface and its second surface bearing against the second contact surface, and means for holding the coupling element substantially centrally and resiliently relative to the first and second contact surfaces.

8 Claims, 3 Drawing Figures

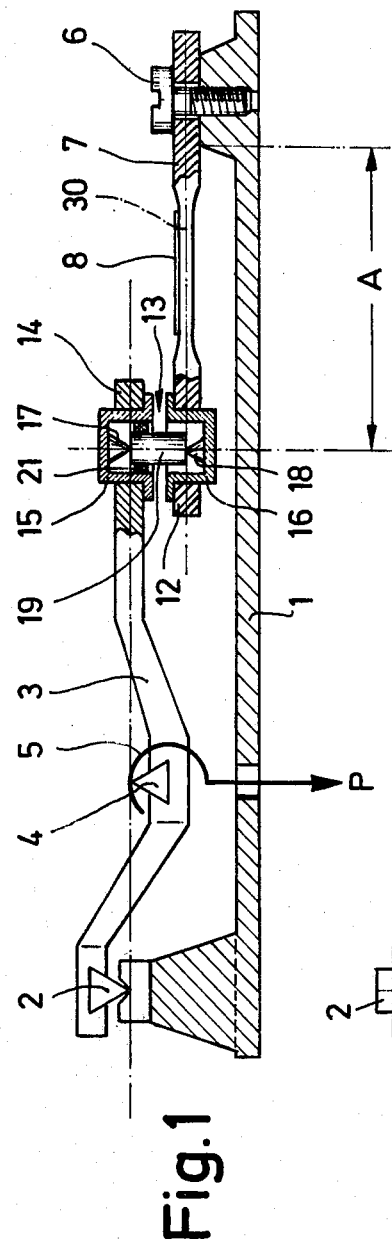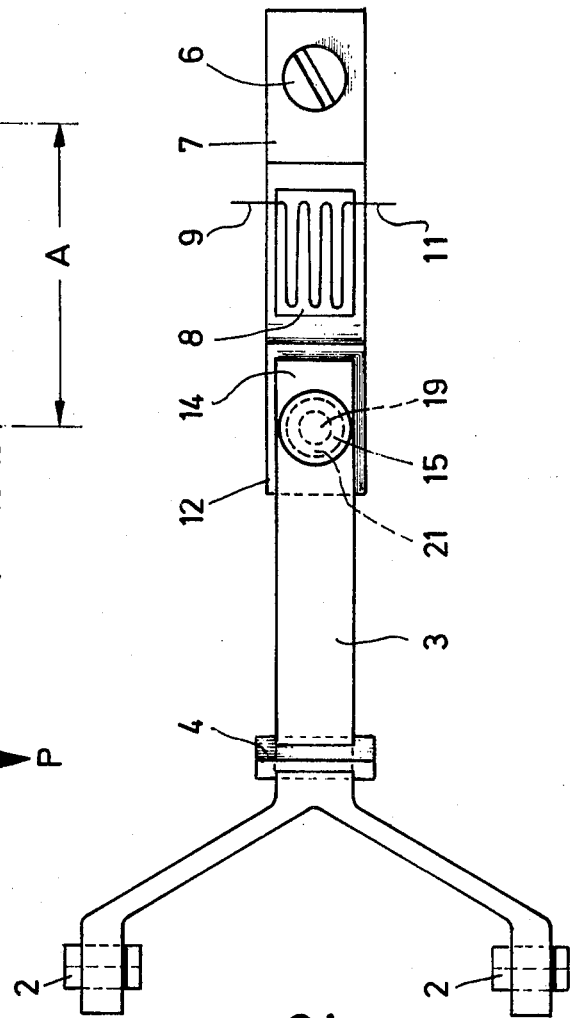
Fig.1
Fig.2

APPARATUS FOR INTRODUCING A FORCE TO BE MEASURED INTO A BENDING ROD

This invention relates to apparatus for introducing a force to be measured from a force transfer element into the free end of a bending rod held rigidly at one end.

In known electromechanical force receivers in the form of bending rods with wire strain gauges (cf. Information Sheet DD 21.111 "Präzisions-Kraftaufnehmer (Precision force receivers) Z 6" of the firm Hottinger Baldwin Messtechnik GmbH, Darmstadt, 1975), either the force transfer or introduction means is a component of the bending rod itself or such means is directly connected to the bending rod at the force introduction point. Force transfer means are known, therefore, by means of which the force is introduced into the bending rod as a compressive or tensile force. Where compressive forces are introduced an element connected directly to the free end of the bending rod is provided, for example, with a spherical cup, and the force is transmitted by way of a sphere inserted in the said cup. In addition, it is also known to introduce a compressive force by way of a rubber-metal thrust bearing which is rigidly secured to the free end of the bending rod. Where tensile forces are introduced the bending rod usually has a transverse bore, in which a pulling rope is suspended by means of a nipple for example.

In all these embodiments of known means for introducing force into bending rods the force transfer means are positively connected to the bending rod, the force transfer means also being used at the same time for fixing the position on the bending rod. This has the disadvantage that the bending rod is easily affected by stresses, in particular lateral forces, which can substantially alter the measurement results. This has a considerable effect when the force transfer means are short, as is necessary in the case of weighing machines of low height. Furthermore, in the case of the known devices for introducing forces to be measured into bending rods the force introduction point does not usually coincide with the central bending axis of the bending rod, and this can also adversely affect the measurement results. In particular however, the distance of the force introduction point from the rigidly held end of the bending rod—the so-called "bending length"—is to a large extent not specifically fixed, and this can lead to variations in the measurement results, particularly after temporary loose attachment, which above all is unavoidable in weighing machines when assembling and disassembling or locking and unlocking. Finally, the known apparatuses for introducing forces into bending rods have the drawback that they are difficult to set and loosen, which is disadvantageous from the point of view of adjustment.

The object of the invention is to provide apparatus for introducing a force to be measured into a bending rod, in particular on electromechanical weighing machines, in which the disadvantages described above do not occur and in which, therefore, a stress-free introduction of force is effected with low height and specifically determined bending length and in which, in addition, easy assembly is possible by allowing relatively large tolerances.

According to the invention, there is provided apparatus for introducing a force to be measured from a force transfer element into the free end of a bending rod held rigidly at one end, said apparatus comprising means for guiding the force transfer element in the direction of said bending rod, a first rounded contact surface on the force transfer element, a second rounded contact surface on the bending rod, a coupling element having first and second flat parallel spaced substantially horizontal surfaces and interposed between the first and second contact surfaces with its first surface bearing against the first contact surface and its second surface bearing against the second contact surface, and means for holding the coupling element substantially centrally and resiliently relative to the first and second contact surfaces.

The invention will now be more particularly described with reference to the accompanying drawings, wherein:

FIG. 1 is a diagrammatic side view of one embodiment of apparatus for introducing a weight force to be measured into the bending rod of a weighing machine;

FIG. 2 is a plan view of the apparatus shown in FIG. 1; and

Figure 3:
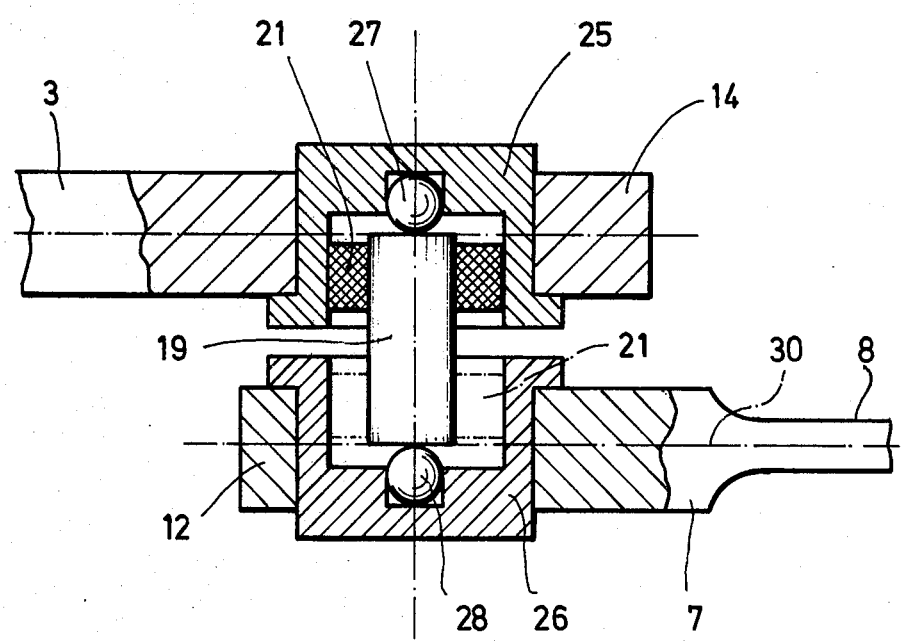
FIG. 3 is an enlarged partial view of a modified embodiment of the apparatus.

A stationary frame member 1 of an electromechanical weighing machine, in particular counter scales, is shown diagrammatically in FIG. 1. A transfer lever 3 is mounted on the left of the frame 1 by means of knife-edges 2. The transfer lever 3 carries a further knife-edge 4 which is acted upon in a known manner by a force P to be measured by means of a suspension attachment 5. On the right side of the frame 1 a conventional bending rod 7 is held rigidly at one end in known manner by means of a screw 6. The bending rod 7 is provided in the usual way with a wire strain gauge 8 shown diagrammatically. The ends 9 and 11 of the line of the wire strain gauge lead to an electronic evaluation device. The free end 12 of the bending rod 7 is connected to the free end 14 of the transfer lever 3 by way of force transfer means 13 described below. In this way, when the lever 3 is loaded with the force P to be measured, the bending rod 7 is bent to a certain extent and the wire strain gauge 8 attached to it is extended as a function of the magnitude of the acting force to be measured, and this extension is used to indicate or record the force P.

In the apparatus illustrated in FIGS. 1 and 2 the force transfer means 13 comprise two essentially identical flanges bushes 15, 16, bush 15 being inserted in the free end of the transfer lever 3 and bush 16 in the free end of the bending rod 7, and each bush bears with its flange against the said respective part. Each bush has a closed end and a conical bearing element having a rounded end with the smallest possible radius is disposed in each bush on the closed end thereof. The outer (contact) points of the conical bearing elements determine the exact lever lengths for the lever 3 and the bending rod 7.

The rounded ends 17 and 18 bear against two flat end faces, parallel to one another, respectively of a coupling element 19 movably mounted between the rounded ends 17,18. The coupling element 19 is preferably in the form of a right cylindrical rod with plane-parallel end faces and is used to introduce the force from the lever 3 into the bending rod 7. As shown in FIG. 1, the coupling element 19 is held centrally, but universally movably on the transfer lever 3 and/or the bending rod 7 by means of a collar 21 made of a resilient material such as for example plastics material or rubber.

A collar 21 mounted on the bending rod 7 is indicated in dot-dash lines in FIG. 3. The conical bearing elements with rounded ends 17, 18 and the coupling element 19 are hardened metal parts.

Since the coupling element 19 is centred resiliently only with respect to the transfer lever 3 and/or the bending rod 7, and the lever 3 is also in fact precisely guided by two knife-edges 2 (shown in FIG. 2) or by resilient bearings and by further structural means not shown, and since, in addition, there is no rigid connection between the coupling element 19 and the rounded ends 17, 18, no disturbing lateral forces can be introduced into the bending rod 7. The rounded end 18 rigidly disposed on the bending rod 7 remains, as already mentioned, at a specific distance from the clamping position (at the screw 6) of the bending rod 7 and so provides a definite bending length A, and so measurement results may be obtained which are free from variation.

As is clearly shown by the simple design, the arrangement illustrated makes possible a simple assembly which allows relatively large tolerances.

In addition, the height of the apparatus according to FIG. 1, in particular at the position of transferring the force between the lever 3 and the bending rod 7, is extremely low, so that the counter scales for example of very low weight and giving a precise measurement may be provided.

A further embodiment is shown in FIG. 3. Right cylindrical flanged bushes 25,26 each having a closed end and a right cylindrical blind bore are inserted in the free ends of the transfer lever 3 and the bending rod 7 in such a way that their flanges bear against the lower surface of the lever 3 and the upper surface of the bending rod 7 respectively. In the embodiment according to FIG. 3 the rounded ends are in the form of small balls 27, 28 which are firmly secured in corresponding recesses in the closed ends of the bushes 25, 26 respectively. The coupling element 19 in the form of a right cylindrical rod with plane-parallel end faces is inserted in a movable manner between the balls 27,28. As shown, the external diameter of the element 19 is considerably smaller than the internal diameter of the right cylindrical bushes 25,26, so that the rod-shaped coupling element 19 may be held centrally in the lever 3 and/or in the bending rod 7 by means of a resilient collar 21, and thus it remains possible for the rod to move slightly in all directions.

As shown in FIGS. 1 and 3, the point of contact between the coupling element 19 and the rounded end 18 or 28 is preferably located on the central bending axis 30 (median axis of force) of the bending rod 7, since accuracy of measurement may be improved in this way.

To summarize, it may be said therefore that because the transfer lever 3 is guided horizontally rigidly and the bending rod 7 is clamped securely to the frame and the coupling element 19 interposed between them is resiliently guided, no horizontal disturbing forces can affect the bending rod 7, thus ensuring constant measurement results.

We claim:

1. Apparatus for introducing a force to be measured from a force transfer element into the free end of a bending rod held rigidly at one end, said apparatus comprising means for guiding the force transfer element in the direction of said bending rod, a first rounded contact surface on the force transfer element, a second rounded contact surface on the bending rod, a coupling element having first and second flat parallel spaced substantially horizontal surfaces and interposed between the first and second contact surfaces with its first surface bearing against the first contact surface and its second surface bearing against the second surface, and means for holding the coupling element substantially centrally and resiliently relative to the first and second contact surfaces.

2. Apparatus as claimed in claim 1, wherein the rounded contact surfaces are formed by balls supported by bushes carried by the transfer element and bending rod respectively.

3. Apparatus as claimed in claim 2, wherein each bush is right cylindrical.

4. Apparatus as claimed in claim 1, wherein the coupling element is a rod with plane-parallel end faces.

5. Apparatus as claimed in claim 4, wherein the rod is right cylindrical.

6. Apparatus as claimed in claim 1, wherein the coupling element is held only on the transfer element by means of a collar of resilient material.

7. Apparatus as claimed in claim 1, wherein the coupling element is held only on the bending rod by means of a collar of resilient material.

8. Apparatus as claimed in claim 1, wherein the coupling element is held on both the transfer lever and the bending rod by means of a collar of resilient material.

* * * * *